United States Patent [19]
Gaulle et al.

[11] Patent Number: 5,721,291
[45] Date of Patent: Feb. 24, 1998

[54] CROSSLINKABLE POLYORGANOSILOXANE COMPOSITION

[75] Inventors: Eric Gaulle, Tassin; Christian Priou, Villeurbanne; Andre Soldat, Lyons, all of France

[73] Assignee: Rhone-Poulenc Chimie, Courbevoie, France

[21] Appl. No.: 602,518

[22] Filed: Feb. 20, 1996

[30] Foreign Application Priority Data

Feb. 24, 1995 [FR] France ................. 95 02392

[51] Int. Cl.$^6$ ................................ C08F 2/46
[52] U.S. Cl. ................. 522/38; 522/31; 522/39; 522/64; 522/65; 522/66; 522/99; 522/170
[58] Field of Search ................. 522/31, 99, 170, 522/38, 39, 64, 65, 66

[56] References Cited

U.S. PATENT DOCUMENTS 5,057,358  10/1991  Riding et al. ..................... 522/31

FOREIGN PATENT DOCUMENTS

| 0 449 027 | 10/1991 | European Pat. Off. | ........ C08L 83/06 |
| 0 464 706 | 1/1992 | European Pat. Off. | ........ C09D 183/06 |
| 2 119 809 | 11/1993 | United Kingdom | ........... C08G 77/14 |
| 93/20163 | 10/1993 | WIPO | ........................... C09D 183/06 |

*Primary Examiner*—Melvyn I. Marquis
*Attorney, Agent, or Firm*—Andrew M. Solomon

[57] ABSTRACT

The invention relates to a composition based on crosslinkable epoxy-functional organopolysiloxanes. This composition comprises:

A. at least 10% by weight of a linear polyorganosiloxane A (POS) of average general formula (II):

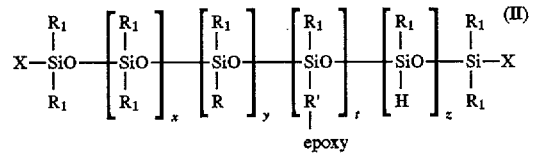

in which: $R_1$ is $CH_3$, R' is an alkylene containing 2 to 50 C, R is an alkyl having from 6 to 26 C, X is $R_1$, H, —R'-epoxy or hydroxyl, x=40–150, t=3–9, z=0–5 and y=0, B. at least one second crosslinkable epoxy-functional POS (B), B being present in the proportion of at most 90% by weight and corresponding to: B(a) with x=160–1000, t=1–15, z=0–5 and y=0, B(b) with x=0–120, t=10–30, z=0–5 and y=0, or B(c) with x=0–200, t=0–5, z=0–5 and y=10–90, C. and at least one photoinitiator.

This composition can be used in the manufacture of protectors for adhesive bodies ("release liners"), papers or plastics or of liner-free self-adhesive labels.

9 Claims, No Drawings

CROSSLINKABLE POLYORGANOSILOXANE COMPOSITION

The present invention essentially relates to crosslinkable polyorganosiloxane compositions. More particularly, these polyorganosiloxane compositions according to the present invention make it possible to adjust the peel forces, both in the direction of an increase and of a decrease in these peel forces, in the manufacture of protectors for adhesive bodies, also known as "release liners", papers or plastics and of "liner"-free self-adhesive labels. The compositions according to the invention also make it possible in particular to obtain a continuous crosslinked film at the surface of paper substrates or of films which result, as a function of the rate of peeling of the adhesive substances, for example PSA, bitumen or hot melt, in a peel force which is independent of the rate of peeling or which increases with the rate of peeling.

The compositions according to the invention can advantageously be crosslinked under radiation, in particular under UV radiation, advantageously using a photoinitiator for crosslinking under UV radiation of cationic type.

In the prior art, organopolysiloxane compositions capable of conferring antiadhesive properties on substrates are known, by the document FR-A-2,291,253 ICI, comprising 100 parts by weight of a polydiorganosiloxane in the form of a crosslinkable antiadhesive composition and 0.1 to 50 parts by weight of a copolymer of average general formula:

with R representing various radicals of alkyl or aralkyl type which can contain an oxygen or sulphur atom and A representing a radical which can be identical to R, an alkenyl, alkoxy or hydroxyl radical or alternatively a hydrogen atom, and it being possible for x, y and z to have various meanings, the sum of x, of y and of z not being less than 20 nor greater than 1000, the ratio of y to the sum of x, of y and of z not being less than 0.05, whereas the total R:Si ratio of the composition is not less than 1:2000.

The crosslinkable antiadhesive composition can comprise a linear diorganopolysiloxane containing hydroxyl radicals joined to silicon, a crosslinking agent chosen from polysiloxanes containing hydrogen joined to silicon, alkyl polysilicates, trialkoxyorganosiloxanes and their partial hydrolysis products and organotriacyloxysilanes, or a catalyst (see claims 1 and 2).

The crosslinkable antiadhesive composition can also comprise a linear diorganopolysiloxane containing vinyl radicals joined to silicon, a polysiloxane containing hydrogen joined to silicon and a platinum compound (see claim 3).

A composition of the same type is also known, by the document FR-A-2,299,379 ICI, according to which the copolymer corresponds to the following modified average general formula:

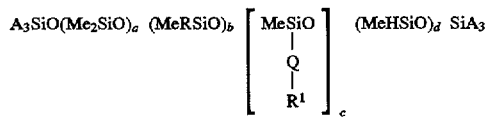

where the meanings are of the same type as those described in the above ICI document. The R and $R^1$ radicals can each have a maximum of 30 carbon atoms. In this document, a peroxide catalyst is also provided (claim 5).

In none of these documents is there described the possibility of the organopolysiloxane containing epoxy functional groups.

In contrast, the document FR-A-2,526,800, General Electric, describes organopolysiloxanes in which the silicon can be substituted by an epoxy-functional organic radical having from 2 to 20 carbon atoms or an acrylic-functional organic radical having from 2 to 20 carbon atoms, at least one of the polymer units being epoxy- or acrylic-functional (see in particular the claims and the examples).

It is specified in the description (pages 17 to 19) that the epoxy- and acrylic-functional silicones can be hardened in order to obtain adhesive coatings by exposing them to ultraviolet radiation in the presence of catalytic amounts of catalysts formed by onium salts or free radical initiators or preferably photoinitiators which makes it possible to accelerate the rate of hardening and to improve the adhesive characteristics in the simultaneous presence of photoinitiators of cationic onium salt type and of free radical photoinitiators.

It is further specified that the hardening and adhesive characteristics of the compositions containing epoxy groups can be improved by addition of epoxy monomers to the composition (page 18, line 25 to page 19, line 21).

However, the characteristics and properties of organopolysiloxane-based compositions can be further improved.

The aim of the present invention is to solve a new technical problem which is to provide new compositions based on epoxy-functional organopolysiloxanes which make it possible to adjust the peel forces as desired, whether for producing an increase or a decrease in these peel forces, which is particularly useful in providing great versatility in the context of the industrial manufacture of protective elements for adhesive bodies ("release liners"), papers or plastics and of self-adhesive labels, in particular without "liner".

A further aim of the present invention is to solve the new technical problem which is to provide new compositions based on epoxy-functional organopolysiloxanes having a peel force which is independent of the rate of peeling or which increases with the rate of peeling.

Another aim of the present invention is to solve these technical problems in a particularly simple and inexpensive way which can be used on an industrial and commercial scale.

The present invention makes it possible to achieve these aims simultaneously, thus being usable on an industrial and commercial scale.

Thus, according to a first aspect, the present invention provides compositions based on crosslinkable epoxy-functional organopolysiloxanes comprising:

A) at least 10% by weight of a linear polyorganosiloxane (POS) A of average general formula:

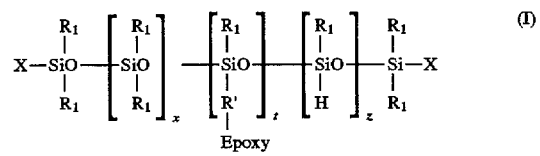

in which:
   the $R_1$ substituent can be identical or different and can represent a linear or branched $C_1$–$C_4$ alkyl radical which is optionally substituted by one or a number of halogen atoms, in particular fluorine; for example methyl, ethyl, propyl, isopropyl or monofluoro-, difluoro- or 3,3,3-trifluoropropyl, or an aryl radical, in particular a phenyl radical, which is optionally substituted by one or a number of halogen atoms, in particular fluorine, the R' chain carrying the epoxy-functional group can be identical or different and comprises from 2 to 50, preferably from 2 to 20, carbon atoms, this epoxy-functional group either being present at the end of the hydrocarbon chain, of the type:

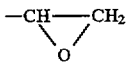

or in an intermediate position, of the type:

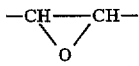

it being possible for this intermediate position of the epoxy-functional group to be present on a cyclic part of the chain, in particular a ring having from 5 to 7 members, preferably a 6-membered ring;

the R' chain being, for example, chosen from:

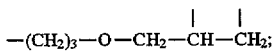

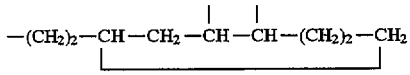

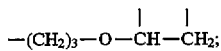

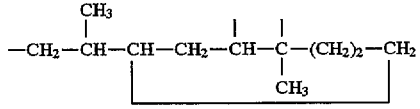

X: is a monovalent radical chosen from $R_1$, H, —R'-epoxy or hydroxyl;

x: is a whole or fractional number varying from 40 to 150;

t: is a whole or fractional number varying from 3 to 9;

z: is a whole or fractional number varying from 0 to 5;

B) at least one second crosslinkable epoxy-functional linear polyorganosiloxane polymer B present in a proportion which can reach 90% by weight of the A+B mixture, chosen from the group composed of:

a) a crosslinkable epoxy-functional linear polyorganosiloxane B(a) of abovementioned general formula (I) with the same definitions, except that:

x is a whole or fractional number varying from 160 to 1000;

t is a whole or fractional number varying from 1 to 15; and z is a whole or fractional number varying from 0 to 5;

b) a crosslinkable epoxy-functional linear polyorganosiloxane B(b) of the abovementioned formula (I), having the same definitions, except that:

x is a whole or fractional number varying from 0 to 120;

t is a whole or fractional number varying from 10 to 30;

z is a whole or fractional number varying from 0 to 5;

c) a polyorganosiloxane B(c) of following general formula (II):

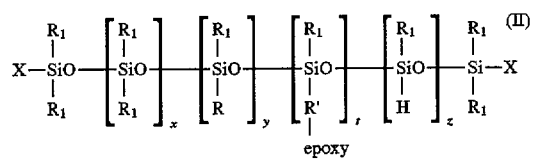

in which:

$R_1$, R' and X have the same definitions as the abovementioned polyorganosiloxanes A of formula (I), the R chain being chosen from linear or branched alkyl chains containing from 9 to 26 carbon atoms, x is a whole or fractional number varying from 0 to 200, y is a whole or fractional number varying from 10 to 90, t is a whole or fractional number varying from 0 to 5, and z is a whole or fractional number varying from 0 to 5, d) and their mixtures, C) and at least one initiator compound for hardening under radiation, preferably a cationic initiator compound, in particular activated under radiation and, in particular, by photochemical activation, in particular UV.

In accordance with the invention:

a the preferred abovementioned polyorganosiloxanes A of general formula (I) are those in which:

$R_1=X=CH_3$;

—R'-epoxy is chosen from:

a) 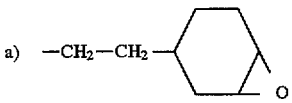

b) 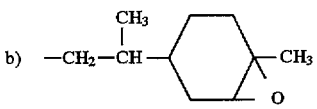

c) 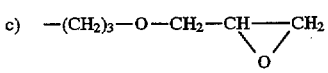

d) 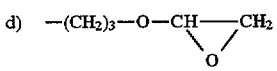

x: is a whole or fractional number varying from 60 to 100, t: is a whole or fractional number varying from 6 to 9, and z: is a whole or fractional number varying from 0 to 2.

the preferred polyorganosiloxanes B(a) defined above are those in which:

x: is a whole or fractional number varying from 200 to 600, t: is a whole or fractional number varying from 1 to 5, and z: is a whole or fractional number varying from 0 to 2, the preferred polyorganosiloxanes B(b) defined above are those in which:

x: is a whole or fractional number varying from 20 to 55, t: is a whole or fractional number varying from 10 to 16, and z: is a whole or fractional number varying from 0 to 2;

and the preferred polyorganosiloxanes B(c) defined above are those in which:

R is a linear or branched alkyl radical having from 10 to 20 carbon atoms, x: is a whole or fractional number varying from 100 to 150, y: is a whole or fractional number varying from 15 to 75, t: is a whole or fractional number varying from 0 to 2, and z: is a whole or fractional number varying from 0 to 2.

The minimum proportion of second polymer POS, e.g. of the abovementioned polydimethylsiloxane type B, can vary within wide limits but, preferably, the minimum proportion will be 0.5% by weight of the A+B mixture and better still at least 1% by weight of the A+B mixture. Proportions which are currently commercially advantageous generally vary between 1% and 50% by weight of the second polymer B with respect to the A+B mixture.

The polyorganosiloxanes A, B(a) and B(b) of the invention containing epoxy functional groups can be obtained, for example, by an addition (hydrosilylation) reaction, from:

(i) corresponding organohydropolysiloxanes (H) which are free of epoxy functional groups, and (ii) organic compounds which are ethylenically unsaturated ($\Psi$) from which the epoxy functional groups derive.

The mixed polyorganosiloxanes B(c) of the invention, containing epoxy and R functional groups, can be obtained, for example, by simultaneous or successive addition (hydrosilylation) reactions, from:

(i) corresponding organohydropolysiloxanes (H) which are free of R and epoxy functional groups, and (ii) organic compounds which are ethylenically unsaturated ($\Psi$) from which the epoxy functional groups derive, and (iii) compounds which are ethylenically unsaturated (a) at the chain end from which the R functional groups derive.

These hydrosilylation reactions can be carried out at a temperature of the order of 20° to 200° C., preferably of the order of 60° to 120° C., in the presence of a catalyst based on a metal from the platinum group; mention may in particular be made of the platinum derivatives and complexes described in U.S. Pat. No. 3,715,334, U.S. Pat. No. 3,814,730, U.S. Pat. No. 3,159,601 and U.S. Pat. No. 3,159,662, which are incorporated in their entirety by reference.

The amounts of catalyst used are of the order of 1 to 300 parts per million, expressed as metal, with respect to the reaction mixture.

In the definition of "mole of $\Psi$", the olefinic unsaturation capable of reacting with (H) by hydrosilylation will be regarded as the unit entity. Likewise, in the definition of "mole of ($\Delta$)", the olefinic unsaturation capable of reacting with (H) by hydrosilylation will be regarded as the unit entity.

The amounts of reactants which can be used generally correspond to the [($\Psi$)+optionally ($\Delta$)]/SiH [of (H)] molar ratio which is of the order of 1 to 5, preferably of the order of 1 to 2.

It has been unexpectedly discovered that the combination of the basic polymer A and of the second polymer B(a) makes it possible to decrease the peel forces, whereas the profile of the peel forces increases in parallel with the rate of peeling.

According to an advantageous embodiment of the invention, the second polymer B(a) is advantageously present in a proportion of 1% to 15% by weight with respect to the A+B mixture.

Moreover, it could be observed, equally unexpectedly, that the second polymer B(b) makes it possible to increase the peel forces, as well as the fact that the profile of the peel forces decreases in parallel with the rate of peeling. The proportion is preferably between 1 and 40% by weight with respect to the A+B mixture.

In these circumstances, it is preferable according to the invention that the polymer B(a), which decreases the peel forces, should not be mixed simultaneously with the polymer B(b), which increases the peel forces, except in the specific cases where it is desired to experiment with a subtle combination of these polymers B(a) and B(b), in order to achieve fine adjustment of the peel force, and of the profile of the peel forces.

Moreover, it has further been unexpectedly observed that the second polymer B(c) does not result in a significant increase or decrease in the peel forces but, in contrast, the peel forces become independent of the rate of peeling. The proportion is preferably between 1 and 20% by weight with respect to the A+B mixture.

Thus, according to a preferred embodiment, it is advantageous not only to combine the second polymer B(c) with the basic polymer A but further to combine it, as third component, with the second polymer B(a) or B(b), in order to make the peel forces independent of the rate of peeling, whether the peel force is maintained, decreased (with the second polymer B(a)) or increased (with the second polymer B(b)).

It is thus understood that the invention is highly versatile, with many possibilities of adaptation to important instances of industrially practical applications.

The invention is therefore of great commercial value.

As indicated above, the composition comprises, in accordance with the invention, at least one initiator compound for hardening under radiation, preferably a cationic initiator compound, in particular activated under radiation and, in particular, by photochemical activation, in particular UV.

Preferred initiator agents are onium salts or organometallic complexes, for example described in patents U.S. Pat. No. 4,069,054, U.S. Pat. No. 4,450,360, U.S. Pat. No. 4,176,999, U.S. Pat. No. 4,640,967, U.S. Pat. No. 1,274,646 and EP-A-0,203,829.

Particularly preferred onium salts are those which are described in preceding applications of the Applicant Company, EP-A-0,562,897 and EP-A-0,562,922. These combined documents are incorporated here by reference.

In the context of the present invention, particularly preferred initiator agents are iodonium arylborate salts, ferrocenium arylborate salts, iodonium tetrafluoroantimonate (phosphate) salts and ferrocenium tetrafluoroantimonate (phosphate) salts.

Advantageous proportions of initiator compound for hardening under radiation generally vary between 0.01% and 20% by weight, preferably between 0.1% and 8% by weight, with respect to the A+B mixture.

Other components, which could be added to the crosslinkable polydimethylsiloxane compositions according to the present invention, are also well known to the person skilled in the art and also result from the prior state of the art, as described in the introduction to the present description.

Other aims, characteristics and advantages of the invention will become clearly apparent in the light of explanatory examples given below simply by way of illustration which should therefore in no way limit the scope of the invention. In the examples, all the percentages are given by weight, except when otherwise indicated; it should be noted that the percentages by weight which are indicated therein:

for each of the polyorganosiloxanes A, B(a), B(b) and B (c), and for the crosslinking photoinitiator, are always expressed with respect to the A+B mixture.

EXAMPLES

Example 1

Use is made of a linear polyorganosiloxane A of formula (I) in which $R_1$ is methyl, i.e. a polydimethylsiloxane, abbreviated as PDMS, with:

—R'-Epoxy corresponding to

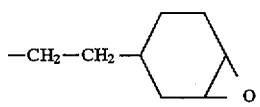

with x=73; t=7; z=0.

Variable amounts of:

linear polymer B, B(a), formed by a polymer of PDMS basic structure identical to that of the linear PDMS polymer A described above but with x=218; t=2; z=0 (Polymer No. 1), linear polymer B, B(a), with a formula identical to that of the linear PDMS basic polymer A above but with x=500; t=15; z=2 (Polymer No. 2)

were introduced into such a linear PDMS basic polymer A with 2.5% by weight of a photoinitiator for crosslinking under UV radiation of the iodonium arylborate type consisting, in this case, of bis(toluyl) iodonium tetrakis (pentafluorophenyl)borate.

The mixture was coated onto a 62 g/m² glassine well-beaten paper substrate and Terphane 6028® polyester, marketed by Rhône-Poulenc, France, 36 μm, and crosslinked using an UV lamp with a power of 120 W/cm at 150 m/min. The peel forces at 180° and at 0.3 m/min with respect to Tesa® 4154, 4651 and 4970 (while warm) test-type adhesive tapes, marketed by Beiersdorf, Germany, were measured with a dynamometer after 20 hours of contact under pressure.

TABLE I

| GLASSINE | | | | | |
|---|---|---|---|---|---|
|  | 0 | 1 | 4 | 8 | 12 |
| % of Polymer No. 1 | | | | | |
| 4154 in cN/cm | 8 | 4 | 2 | 15 | 1 |
| 4651 in cN/cm | 22 | 13 | 10 | 8 | 5 |
| 4970 (70°) in cN/cm | 17 | 12 | 10 | 8.5 | 7 |
| % of Polymer No. 2 | | | | | |
| 4154 in cN/cm | 8 | 2.5 | 15 | 1 | 0.6 |
| 4651 in cN/cm | 22 | 11 | 8 | 6 | 5 |
| 4970 (70°) in cN/cm | 17 | 15 | 10 | 9 | 8 |

TABLE II

| POLYESTER, 36 μm | | | | | |
|---|---|---|---|---|---|
|  | 0 | 1 | 4 | 8 | 12 |
| % of Polymer No. 1 | | | | | |
| 4154 in cN/cm | 5 | 2 | 1.8 | 1.3 | 1 |
| 4651 in cN/cm | 11 | 7 | 6 | 5 | 4 |
| 4970 (70°) in cN/cm | 10 | 6 | 5 | 4 | 4 |
| % of Polymer No. 2 | | | | | |
| 4154 in cN/cm | 5 | 2.5 | 1.5 | 1 | 0.6 |
| 4651 in cN/cm | 11 | 9 | 8 | 6 | 5 |
| 4970 (70°) in cN/cm | 10 | 6 | 5 | 3 | 3 |

It results from Tables I and II that the increase in the degree of substitution of Polymers 1 and 2 makes it possible to decrease the peel forces at a low rate of peeling.

Example 2

Use is made of a linear PDMS basic polymer A identical to that used in Example 1 and variable amounts by weight of Polymer No. 1 and of Polymer No. 2, also used in Example 1, are introduced with 2.5% by weight of a photoinitiator for crosslinking under UV radiation of the iodonium arylborate type, consisting in this case of bis (toluyl)iodonium tetrakis(pentafluorophenyl)borate.

The mixture was coated onto a 62 g/m² glassine substrate and crosslinked using an UV lamp with a power of 120 W/cm at 150 m/min. The peel forces at 180° and at different rates of peeling with respect to Tesa® 4651 and 4970 (while warm) test-type adhesive tapes, marketed by Beiersdorf, Germany, and with respect to a tackified acrylic emulsion adhesive, commercially available under the tradename Acronal V205® from BASF, Germany, were measured with a dynamometer after 20 hours of contact under pressure.

TABLE III-A

| | Peel forces in cN/cm | | | | | |
|---|---|---|---|---|---|---|
| Adhesive | Tesa® 4651 | | Tesa® 4970 | | Acronal V205® | |
| % of Polymer No. 1 | 0 | 10 | 0 | 10 | 0 | 10 |
| 0.3 m/min | 22 | 10 | 17 | 7 | 15 | 3 |
| 10 m/min | 14 | 12 | 10.5 | 8.5 | 9 | 4 |
| 30 m/min | 11 | 16 | 9 | 11 | 6 | 5 |
| 100 m/min | 10 | 22 | 7.5 | 16 | 5.5 | 7 |
| 200 m/min | 10 | 25 | 8 | 18 | 6 | 9 |

TABLE III-B

| | Peel forces in cN/cm | | | | | |
|---|---|---|---|---|---|---|
| Adhesive | Tesa® 4651 | | Tesa® 4970 | | Acronal V205® | |
| % of Polymer No. 2 | 0 | 10 | 0 | 10 | 0 | 10 |
| 0.3 m/min | 22 | 10 | 17 | 7 | 15 | 3 |
| 10 m/min | 14 | 17 | 10.5 | 8.5 | 9 | 5 |
| 30 m/min | 11 | 25 | 9 | 12 | 6 | 6.5 |
| 100 m/min | 10 | 34 | 7.5 | 17 | 5.5 | 9 |
| 200 m/min | 10 | 42 | 8 | 22 | 6 | 13 |

It results from Tables III-A and B that the incorporation of a polymer B of formula B(b) makes it possible to modify the profile of the peel forces as a function of the rate of peeling. The forces increase with the rate of peeling.

Example 3

Variable amounts of:

PDMS polymer B, B(b), with a chemical formula identical to that of the polymer A but with x=45; t=11; z=1 (Polymer 3), PDMS polymer B, B(b), with a formula identical to the polymer A but with x=110; t=16; z=0 (Polymer 4)

were introduced into the linear PDMS basic polymer A of Example 1 with x=73; t=7; z=0 with 2.5% by weight of a photoinitiator for crosslinking under UV radiation of the iodonium arylborate type, consisting in this instance of bis(toluyl)iodonium tetrakis(pentafluorophenyl)borate.

The mixture was coated onto a 62 g/m² glassine substrate and Terphane 6028® polyester, 36 μm, and crosslinked using an UV lamp with a power of 120 W/cm at 150 m/min. The peel forces at 180° and at 0.3 m/min with respect to Tesa® 4154, 4651 and 4970 (while warm) test-type adhesive tapes, marketed by Beiersdorf, Germany, were measured with a dynamometer after 20 hours of contact under pressure.

TABLE IV

GLASSINE

| % of Polymer No. 3 | 0 | 15 | 40 |
|---|---|---|---|
| Tesa® 4154 in cN/cm | 8 | 11 | 18 |
| Tesa® 4651 in cN/cm | 22 | 29 | 42 |
| Tesa® 4970 (70°) in cN/cm | 17 | 66 | 145 |

TABLE V

POLYESTER

| % of Polymer No. 3 | 0 | 15 | 40 |
|---|---|---|---|
| Tesa® 4154 in cN/cm | 5 | 6.5 | 9 |
| Tesa® 4651 in cN/cm | 11 | 13 | 16 |
| Tesa® 4970 (70°) in cN/cm | 10 | 15 | 22 |

TABLE VI

GLASSINE

| % of Polymer No. 4 | 0 | 15 | 40 |
|---|---|---|---|
| Tesa® 4154 in cN/cm | 8 | 10 | 12 |
| Tesa® 4651 in cN/cm | 22 | 28 | 38 |
| Tesa® 4910 (70°) in cN/cm | 17 | 28 | 47 |

TABLE VII

POLYESTER

| % of Polymer No. 4 | 0 | 15 | 40 |
|---|---|---|---|
| Tesa® 4154 in cN/cm | 5 | 6.5 | 10 |
| Tesa® 4651 in cN/cm | 11 | 12 | 17 |
| Tesa® 4970 (70°) in cN/cm | 10 | 12 | 32 |

Example 4

Variable amounts by weight of:

PDMS polymer B, B(b), with a formula identical to the basic polymer A of Example 1 but with x=45; t=11; z=1 (Polymer 3), PDMS polymer B, B(b), with a formula identical to the basic polymer A of Example 1 but with x=110; t=16; z=0 (Polymer 4)

were introduced into the linear PDMS basic polymer A of Example 1 with x=73; t=7; z=0 with 2.5% by weight of a photoinitiator for crosslinking under UV radiation of the iodonium arylborate type, consisting in this instance of bis(toluyl) iodonium tetrakis(pentafluorophenyl)borate.

The mixture was coated onto a 62 g/m² glassine substrate and crosslinked using an UV lamp with a power of 120 W/cm at 150 m/min. The peel forces at 180° and at different rates of peeling with respect to 4651, 4970 (while warm) and 4154 test-type adhesive tapes were measured with a dynamometer after 20 hours of contact under pressure.

TABLE VIII-A

| Adhesive | Peel forces in cN/cm | | | | | |
|---|---|---|---|---|---|---|
| | Tesa® 4651 | | Tesa® 4970 | | Tesa® 4154 | |
| % of Polymer No. 3 | 0 | 10 | 0 | 10 | 0 | 10 |
| 0.3 m/min | 22 | 27 | 17 | 52 | 8 | 10 |
| 10 m/min | 14 | 12 | 10.5 | 35 | 4 | 7 |
| 30 m/min | 11 | 13 | 9 | 25 | 2 | 5 |
| 100 m/min | 10 | 12 | 7.5 | 20 | 1.5 | 3 |
| 200 m/min | 10 | 12 | 8 | 18 | 1.2 | 2 |

TABLE VIII-B

| Adhesive | Peel forces in cN/cm | | | | | |
|---|---|---|---|---|---|---|
| | Tesa® 4651 | | Tesa® 4970 | | Tesa® 4154 | |
| % of Polymer No. 4 | 0 | 10 | 0 | 10 | 0 | 10 |
| 0.3 m/min | 22 | 26 | 17 | 25 | 8 | 9 |
| 10 m/min | 14 | 13 | 10.5 | 20 | 4 | 6 |
| 30 m/min | 11 | 12 | 9 | 2 | 3 | 3 |
| 100 m/min | 10 | 12 | 7.5 | 10 | 1.5 | 2 |
| 200 m/min | 10 | 12 | 8 | 10 | 1.2 | 1.5 |

It results from Tables VIII-A and B that the incorporation of the polymers B(b) makes it possible to increase the peel forces without modifying the profile of the peel forces as a function of the rate of peeling with respect to the polymers A. The forces decrease with the rate of peeling.

Example 5

Variable amounts by weight of:

linear PDMS polymer B, B(c), of abovementioned formula II with:
—R'-Epoxy corresponding to

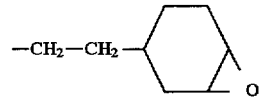

R=tetradecyl and
$R_1$=X=$CH_3$, and with x=145; y=50; t=0; z=0 (Polymer No. 5), linear PDMS polymer B, B(c), of formula II having the same meaning as Polymer No. 5 defined above but with x=148; y=50; t=2; z=1 (Polymer No. 6), were introduced into the linear PDMS basic polymer A of Example 1 with x=73; t=7; z=0 with 2.5% by weight of a photoinitiator for crosslinking under UV radiation of the iodonium arylborate type, bis(toluyl)iodonium tetrakis (pentafluorophenyl)borate.

The mixture was coated onto a 62 g/m² glassine substrate and crosslinked using an UV lamp with a power of 120 W/cm at 150 m/min. The peel forces at 180° and at different rates of peeling with respect to Tesa® 4651, 4970 (while warm) and 4154 test adhesive tapes, marketed by Beiersdorf, Germany, were measured with a dynamometer after 20 hours of contact under pressure.

TABLE IX-A

| | Peel forces in cN/cm | | | | | |
|---|---|---|---|---|---|---|
| Adhesive | Tesa® 4651 | | Tesa® 4970 | | Tesa® 4154 | |
| % of Polymer No. 5 | 0 | 10 | 0 | 10 | 0 | 10 |
| 0.3 m/min | 22 | 27 | 17 | 52 | 8 | 10 |
| 10 m/min | 14 | 12 | 10.5 | 35 | 4 | 7 |
| 30 m/min | 11 | 13 | 9 | 25 | 2 | 5 |
| 100 m/min | 10 | 12 | 7.5 | 20 | 1.5 | 3 |
| 200 m/min | 10 | 12 | 8 | 18 | 1.2 | 2 |

TABLE IX-B

| | Peel forces in cN/cm | | | | | |
|---|---|---|---|---|---|---|
| Adhesive | Tesa® 4651 | | Tesa® 4970 | | Tesa® 4154 | |
| % of Polymer No. 6 | 0 | 10 | 0 | 10 | 0 | 10 |
| 0.3 m/min | 22 | 26 | 17 | 25 | 8 | 9 |
| 10 m/min | 14 | 13 | 10.5 | 20 | 4 | 6 |
| 30 m/min | 11 | 12 | 9 | 15 | 2 | 3 |
| 100 m/min | 10 | 12 | 7.5 | 10 | 1.5 | 2 |
| 200 m/min | 10 | 12 | 8 | 10 | 1.2 | 1.5 |

It results from Tables IX-A and B that the incorporation of the polymers B(c) has no significant influence on the level

TABLE X

| | Peel forces in cN/cm | | | | | | | | |
|---|---|---|---|---|---|---|---|---|---|
| | Tesa® 4651 | | | Tesa® 4970 | | | Tesa® 4154 | | |
| Adhesive Mixture | A | A + B(a) + B(c) | A + B(b) + B(c) | A | A + B(a) + B(c) | A + B(b) + B(c) | A | A + B(a) + B(c) | A + B(b) + B(c) |
| 0.3 m/min | 22 | 10 | 42 | 17 | 7 | 145 | 8 | 2 | 18 |
| 10 m/min | 14 | 11 | 38 | 11 | 6.5 | 125 | 4 | 1.8 | 18 |
| 30 m/min | 11 | 10 | 40 | 9 | 7 | 132 | 2 | 1.9 | 17 |
| 100 m/min | 10 | 10 | 41 | 7.5 | 6 | 135 | 1.5 | 2 | 19 |
| 200 m/min | 10 | 10 | 43 | 8 | 7 | 145 | 1.2 | 1.9 | 18 | of the peel forces. As a function of the rate of peeling with respect to the polymers A, the forces become independent of the rate of peeling.

Example 6

6.1 A+B(a)+B(c) Mixture

The following amounts are charged to the linear PDMS basic polymer A of Example 1 with x=73; t=7; z=0 in order to prepare the A+B(a)+B(c) mixture:

10% by weight with respect to the mixture of linear PDMS polymer B, B(a), defined in Example 1 with x=218; t=2; z=0 (Polymer No. 1), 10% by weight with respect to the mixture of linear PDMS polymer B, B(c), defined in Example 5 with x=145; y=50; t=0; z=0 (Polymer No. 5);

6.2 A+B(b)+B(c) Mixture

The following amounts are charged to the linear PDMS basic polymer A of Example 1 with x=73; t=7; z=0:

40% by weight with respect to the mixture of linear PDMS polymer B, B(b), defined in Example 3 with x=45; t=11; z=1 (Polymer No. 3); and 1% by weight with respect to the mixture of linear PDMS polymer B, B(c), defined in Example 5 with x=145; y=50; t=0; z=0 (Polymer No. 5);

each mixture having added to it 2.5% by weight of a photoinitiator for crosslinking under UV radiation of the iodonium arylborate type, consisting in this instance of bis(toluyl)iodonium tetrakis(pentafluorophenyl)borate.

Each mixture was coated onto a 62 g/m² glassine substrate and crosslinked using an UV lamp with a power of 120 W/cm at 150 m/min. The peel forces at 180° and at different rates of peeling with respect to Tesa® 4651, 4970 (while warm) and 4154 test-type adhesive tapes, marketed by Beiersdorf, Germany, were measured with a dynamometer after 20 hours of contact under pressure.

It results from Table X that the incorporation of the polymers B(c) has no significant influence on the level of the peel forces in the A+B(a) and A+B(b) polymer mixtures. The levels of the peel forces increase and decrease in accordance with the effect of the polymers B(a) and B(b). As a function of the rate of peeling with respect to the polymers A, the forces become independent of the rate of peeling.

We claim:

1. Composition based on a crosslinkable epoxy-functional organopolysiloxane comprising:

A) a linear polyorganosiloxane (POS) A of average general formula:

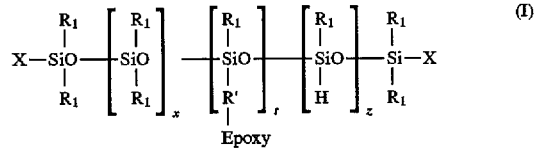

in which:

the $R_1$ substituent is identical or different and represents a linear or branched $C_1$–$C_4$ alkyl radical which is optionally substituted by one or a number of halogen atoms or an aryl radical which is optionally substituted by one or a number of halogen atoms, the R' chain carrying the epoxy-functional group is identical or different and comprises from 2 to 50 carbon atoms, this epoxy-functional group either being present at the end of the hydrocarbon chain, of the type:

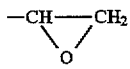

or in a ring, of the type:

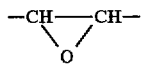

it being possible for this intermediate position of the epoxy-functional group to be present on a cyclic part of the chain, X: is a monovalent radical chosen from $R_1$, H, or hydroxyl;

x: is a whole or fractional number varying from 40 to 150;

t: is a whole or fractional number varying from 3 to 9;

z: is a whole or fractional number varying from 0 to 5;

B) at least one second crosslinkable epoxy-functional linear polyorganosiloxane polymer B being present in a proportion between 1 and 50% by weight of the A+B mixture, selected from the group consisting of:

a) a crosslinkable epoxy-functional linear polyorganosiloxane B(a) of general formula (I):

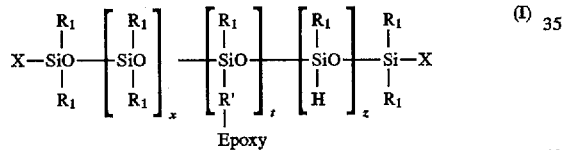

wherein:

$R_1$, R' and X have the same definitions as the above mentioned polyorganosiloxane A of formula (I), X is a whole or fractional number varying from 160 to 1000;

t is a whole or fractional number varying from 1 to 15, and z is a whole or fractional number varying from 0 to 5;

b) a crosslinkable epoxy-functional linear polyorganosiloxane B(b) of the formula (I):

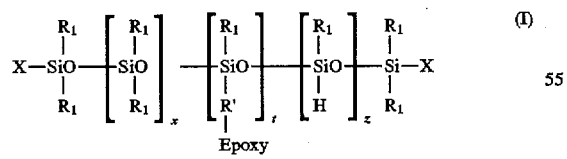

wherein:

$R_1$, R' and X have the same definitions as the above mentioned polyorganosiloxane A of formula (I), x is a whole or fractional number varying from 0 to 120;

t is a whole or fractional number varying from 10 to 30;

z is a whole or fractional number varying from 0 to 5; and c) a polyorganosiloxane B(c) of following formula (II):

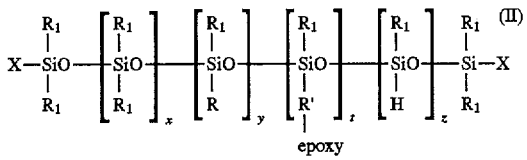

in which:

$R_1$, R' and X have the same definitions as the above mentioned polyorganosiloxane A of formula (I), the R chain being chosen from linear or branched alkyl chains containing between 9 and 26 carbon atoms:

x is a whole or fractional number varying from 0 to 200, y is a whole or fractional number varying from 10 to 90, t is a whole or fractional number varying from 0 to 5, and z is a whole or fractional number varying from 0 to 5, d) and their mixtures; and C) and at least one initiator compound for hardening said organopolysiloxane under radiation.

2. Composition according to claim 1, characterized in that:

the polyorganosiloxanes A of general formula (I) are those in which:

$R_1 = X = CH_3$,

—R'-epoxy is selected from the group consisting of:

a) 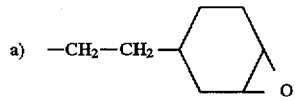

b) 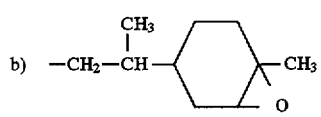

c) 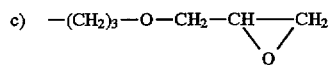

d) 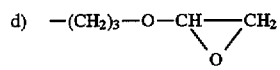

X: is a whole or fractional number varying from 60 to 100, t: is a whole or fractional number varying from 6 to 9, and z: is a whole or fractional number varying from 0 to 2, the polyorganosiloxanes B(a) are those of the formula:

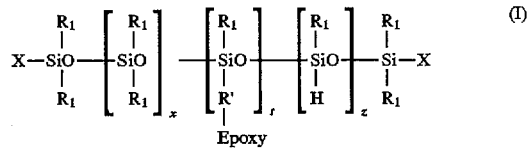

in which:

x: is a whole or fractional number varying from 200 to 600, t: is a whole or fractional number varying from 1 to 5, and z: is a whole or fractional number varying from 0 to 2, the polyorganosiloxanes B(b) are those of the formula:

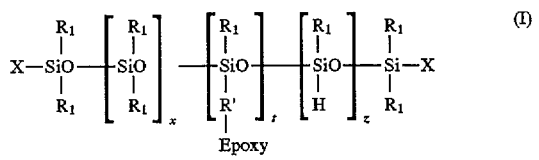

in which:

x: is a whole or fractional number varying from 20 to 55, t: is a whole or fractional number varying from 10 to 16, and z: is a whole or fractional number varying from 0 to 2, the polyorganosiloxanes B(c) are those of the formula:

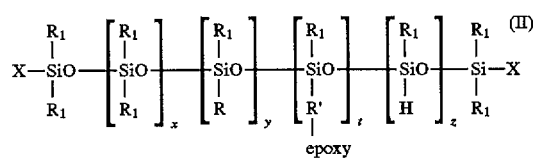

in which:

$R_1$, R' and X have the same definitions as the above mentioned polyorganosiloxane A of Formula (I)

R is a linear or branched alkyl radical having from 10 to 20 carbon atoms, x: is a whole or fractional number varying from 100 to 150, y: is a whole or fractional number varying from 15 to 75, t: is a whole or fractional number varying from 0 to 2, and z: is a whole or fractional number varying from 0 to 2.

3. Composition according to claim 1, characterized in that it comprises a combination of the basic polymer A and of the second polymer B(a), in order to decrease the peel forces and increase the profile of the peel forces in parallel with the rate of peeling.

4. Composition according to claim 1, characterized in that it comprises a combination of the basic polymer A and of the second polymer B(b), in order to increase the peel forces and in order to decrease the profiles of the peel forces in parallel with the rate of peeling.

5. Composition according to claim 1, characterized in that the second polymer B(c) is present either in combination with the polymer A or as third component, with the second polymer B of formula B(a) or of formula B(b), in order to make the peel forces independent of the rate of peeling.

6. Composition according to claim 1, characterized in that the above mentioned initiator compound is an onium salt or an organometallic complex.

7. Composition according to claim 1, wherein the said initiator compound is a cationic initiator compound which is activated upon exposure to UV radiation.

8. Composition according to claim 6, wherein the said initiator compound is an onium salt selected from the group consisting of an iodonium arylborate salt, a ferrocenium arylborate salt, a iodonium tetrafluoroantimonate (phosphate) salt and a ferrocenium tetrafluoroantimonate (phosphate) salt.

9. Protective components for adhesive bodies having a continuous crosslinked film of a composition based on crosslinkable epoxy-functional organopolysiloxanes as defined in claim 1.

* * * * *